(12) United States Patent
Marcello et al.

(10) Patent No.: US 10,788,080 B2
(45) Date of Patent: Sep. 29, 2020

(54) DOG CLUTCH

(71) Applicant: FPT INDUSTRIAL S.p.A., Turin (IT)

(72) Inventors: Alex Marcello, Turin (IT); Alessandro Mantovan, Saint'Antonino di Susa (IT)

(73) Assignee: FPT INDUSTRIAL S.p.A., Turin (IT)

( * ) Notice: Subject to any disclaimer, the term of this patent is extended or adjusted under 35 U.S.C. 154(b) by 92 days.

(21) Appl. No.: 16/153,379

(22) Filed: Oct. 5, 2018

(65) Prior Publication Data

US 2019/0195289 A1 Jun. 27, 2019

(30) Foreign Application Priority Data

Oct. 10, 2017 (IT) .......................... 102017000113917

(51) Int. Cl.
*F16D 11/14* (2006.01)
*F16D 71/00* (2006.01)
*F16D 11/00* (2006.01)

(52) U.S. Cl.
CPC .............. *F16D 11/14* (2013.01); *F16D 71/00* (2013.01); *F16D 2011/008* (2013.01); *F16D 2300/10* (2013.01)

(58) Field of Classification Search
CPC . F16D 2011/008; F16D 2300/10; F16D 11/14
See application file for complete search history.

(56) References Cited

U.S. PATENT DOCUMENTS

| 4,318,702 | A | * | 3/1982 | Stacey | .................. | B63H 23/08 440/75 |
| 5,699,871 | A | * | 12/1997 | Hara | .................... | B60K 17/348 180/247 |
| 8,834,217 | B2 | * | 9/2014 | Yoshimura | ............. | B63H 20/20 192/108 |
| 9,518,612 | B2 | * | 12/2016 | Brathwaite | ............. | B23F 15/06 |

(Continued)

FOREIGN PATENT DOCUMENTS

| DE | 2214508 A1 | * | 10/1973 | ............. F16D 11/14 |
| DE | 3904158 | | 8/1990 | |

(Continued)

OTHER PUBLICATIONS

Italian Search Report for Italian Application No. IT 201700113917, dated May 29, 2018, 7 pages.

*Primary Examiner* — Stacey A Fluhart
(74) *Attorney, Agent, or Firm* — Stetina Brunda Garred and Brucker

(57) ABSTRACT

A dog clutch comprising a sleeve and a relative crown with respective teeth conformed for engaging each one alternatively to the others wherein, during operation a pulling side for said teeth is defined, that identifies a surface through which the torque is transferred, and wherein, the teeth pulling side or at least the crown and/or the sleeve is conformed so that the relative tooth is tapered from a relative base towards a relative vertex, wherein said pulling side comprises at least three portions of which a first portion is adjacent to said base and a third portion is adjacent to said (Continued)

vertex following a rectilinear path and being approximately parallel to generating line of said crown or sleeve, and having a second portion adjoining said first portion with said third portion.

12 Claims, 4 Drawing Sheets

(56) References Cited

U.S. PATENT DOCUMENTS

| | | | | |
|---|---|---|---|---|
| 2002/0112934 | A1* | 8/2002 | Karambelas | B60K 17/3515 |
| | | | | 192/69.43 |
| 2014/0144744 | A1* | 5/2014 | Hirawaki | F16D 23/02 |
| | | | | 192/69.9 |
| 2015/0068862 | A1* | 3/2015 | Fujii | F16D 11/14 |
| | | | | 192/84.9 |
| 2016/0053822 | A1* | 2/2016 | Nefacy | B60K 17/02 |
| | | | | 192/71 |

FOREIGN PATENT DOCUMENTS

| | | |
|---|---|---|
| JP | 2016061361 | 4/2016 |
| JP | 2016065592 | 4/2016 |

\* cited by examiner

DOG CLUTCH

CROSS-REFERENCE TO RELATED APPLICATIONS

This patent application claims priority from Italian patent application no. 102017000113917 filed on Oct. 10, 2017, the entire disclosure of which is incorporated herein by reference.

TECHNICAL FIELD OF THE INVENTION

The invention relates to the field of dog clutches, in particular in the automotive industry.

STATE OF THE ART

Dog clutches are widely used and known. The two gear wheels involved have a cylindrical shape with teeth that project axially, i.e. parallel to the rotation axis of the clutch, and the opposite sides of the teeth are parallel to a generating line of the relative cylinder. On the contrary, in gear wheels with radial teeth, the base of each tooth is larger than the relative vertex and, therefore, the opposite sides mutually converge.

In the automotive industry, dog clutches are widely used to start the rotation, for example, of a further driving axle. They also find further application in hybrid vehicles, where the electric part and/or the fossil-fuel part can be disconnected from the vehicle transmission.

This clutch consists of two mutually complementary gears, one of them called "crown" and the other one "sleeve".

FIG. 1 shows an example of a dog clutch according to the state of the art, wherein Z indicates the distance between the crown K and the sleeve M, h the height of the teeth and of the complementary slots or recesses, S indicates the pitch between two teeth, whereas A and B indicate two opposite sides of a tooth and C indicates the width of the tooth in a circumferential direction.

The tangential tolerance T between a tooth and a relative recess is given by S-C, which usually is in the range of hundredths of millimetre.

Different dog clutches were tested in order to connect an electric motor to a vehicle transmission, but there are two recurring opposite problems. If the tangential tolerance between the teeth of the crown and of the sleeve is very small, a great actuation force needs to be applied in order to operate the clutch, i.e. a force way greater than 150 N, which causes a high clutch noise.

Clutch actuation force means that the clutch is caused to close by having the teeth of the crown mesh with the recesses of the sleeve and vice versa or it means that the clutch is caused to open by mutually disengaging the teeth of the crown and of the sleeve.

The clutch further is subjected to breaking because of the excessive actuation force needed to ensure a safe closing of the clutch.

If, on the contrary, the tangential tolerance between the teeth is greater, i.e. in the range of tenths of millimetre, a smaller clutch actuation force is needed, with a better acoustic comfort during the meshing. Unfortunately, however, the torque transferred through the clutch is close to zero and the clutch generates continuous noise and vibrations because of the great tangential tolerance and due to the continuous bouncing between the teeth of the crown and of the sleeve.

These vibrations lead to a premature wear of both sides of the teeth of both gears and cause an unacceptable noise, especially for electric applications.

The "pulling" interface is the contact surface between two teeth, through which torque is transferred during the operation. This surface corresponds to a first flank on the teeth of the crown and to a first flank on the teeth of the sleeve.

The "release" interface is the surface, not necessarily a contact surface, of the teeth through which no torque is transferred during the operation. This surface corresponds to a second flank on the teeth of the crown and to a second flank on the teeth of the sleeve, which are respectively opposite to said first flanks.

This surface is or is not a contact surface depending on the tangential tolerances between the teeth of the crown and the teeth of the sleeve.

SUMMARY OF THE INVENTION

The object of the invention is to provide a dog clutch which ensures a safe mesh with a low noise and a small clutch actuation force.

The idea on which the invention is based is that of shaping the pulling side of a tooth of said crown and/or sleeve according to at least a first, a second and a third portion starting from the base of the tooth, wherein the first and the third portions are parallel to a generating line, so that the tooth is tapered towards the relative vertex and the second portion joins the first portion to the third portion.

Advantageously, the nominal pitch of the teeth, measured in the area of the said first portion, is such as to ensure a small tolerance, so that, when the clutch is closed, under conditions of transferred torque close to zero, the clutch does not vibrate.

Advantageously, during the clutch closing procedure, the apex pitch, i.e. measured in the area of the vertices of two consecutive teeth, is greater than the nominal pitch and, therefore, the clutch can feature a small actuation force.

According to a proffered clutch implementation method, the crown is associated with a grater inertia, i.e. the inertia of the vehicle, whereas the sleeve is associated with a smaller inertia, i.e. the inertia of an electric motor to be connected to the transmission of the vehicle. Furthermore, the sleeve has teeth with sides that are parallel to a generating line, whereas the crown is provided with a pulling side configured according to the invention.

Advantageously, the fact that the first portion of the side, i.e. the one closest to the vertex of the tooth, is parallel to a directrix line of the gear wheel ensures a neutral behaviour of the clutch when the sleeve meshes with the crown.

The second portion of the pulling side according to the invention develops reaction forces that cause the sleeve to disengage the relative crown. The smaller the axial extension of the second portion is, the greater the reaction forces are. Therefore, the axial extension is correlated to the clutch actuation force.

A line tangent to said second portion forms an angle with a directrix line and this angle must preferably be smaller than 60°. Preferably the angle measures 30-50°.

The subject-matter of the invention also includes a terrestrial or naval propulsion system comprising a transmission provided with the dog clutch described above. The difference between a naval propulsion system and a terrestrial propulsion system basically lies in the presence, in the first one, of at least one driving axle and, in the second one, of at least one propeller or waterjet.

The claims describe preferred embodiments of the invention, thus forming an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein.

In the figures, the same numbers and the same reference letters indicate the same elements or components.

For the purposes of the invention, the term "second" component does not imply the presence of a "first" component. As a matter of fact, these terms are only used for greater clarity and should not be interpreted in a limiting manner.

DETAILED DESCRIPTION OF EMBODIMENTS

Figure 1:
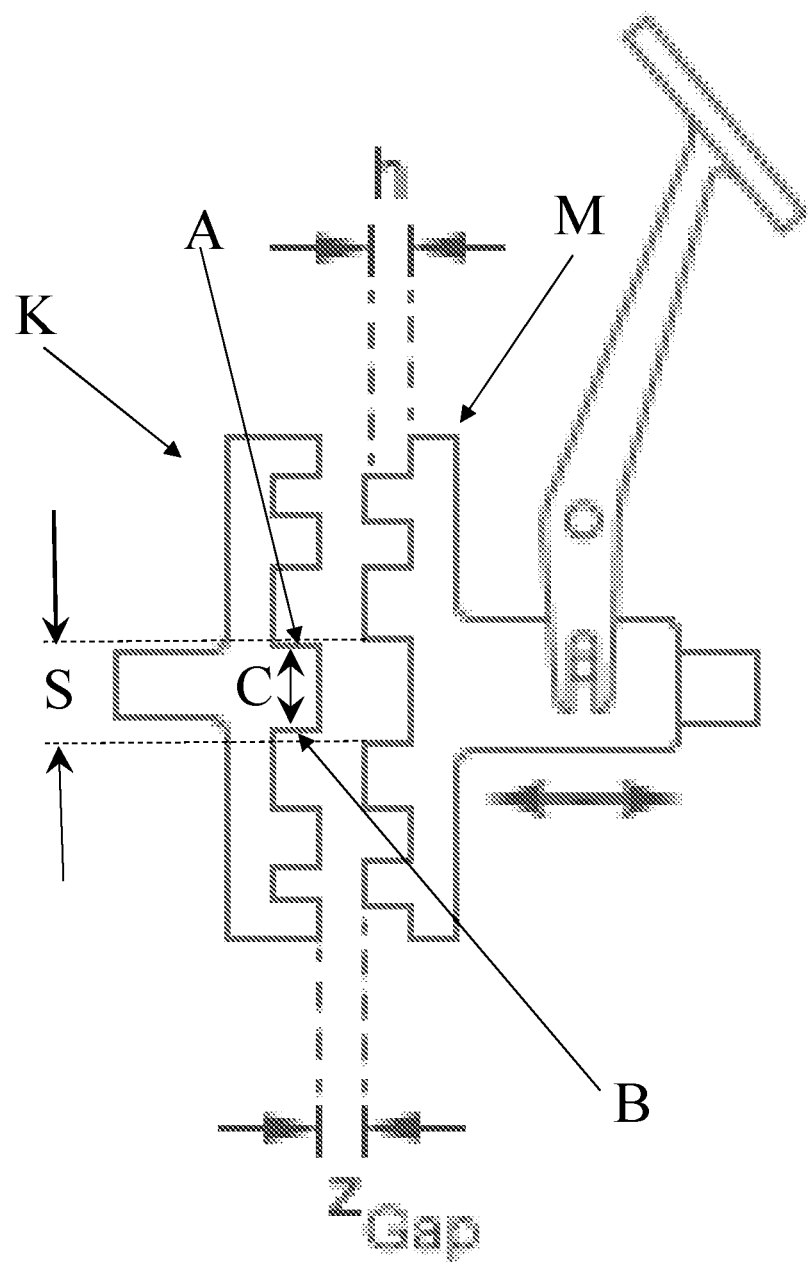
FIG. 1 shows an example of a dog clutch according to the state of the art, highlighting the characteristic parameters of the clutch.
Figure 2:
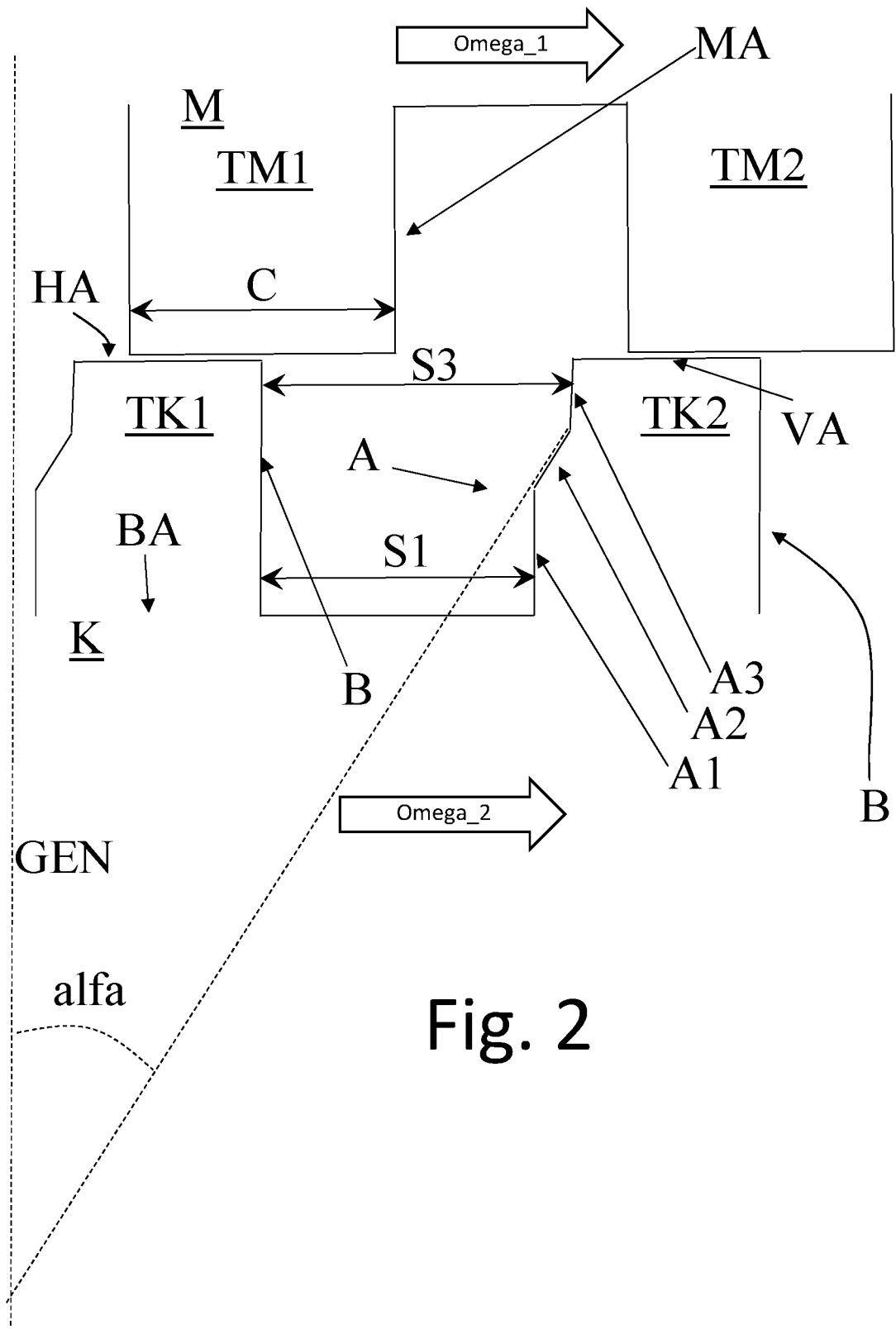
FIG. 2 shows a dog clutch according to the invention.

FIG. 2 shows a dog clutch according to the invention in a view from the top. In particular, a crown K and a relative sleeve M are shown from the top, preferably rectified in the plane, so that the description below does not always need to specify that the widths are circumferential widths, i.e. measured on arcs of a circle.

For the sake of simplicity, only two teeth TM1 and TM2 of the sleeve and two teeth TK1 and TK2 of the crown are shown.

Figure 4:
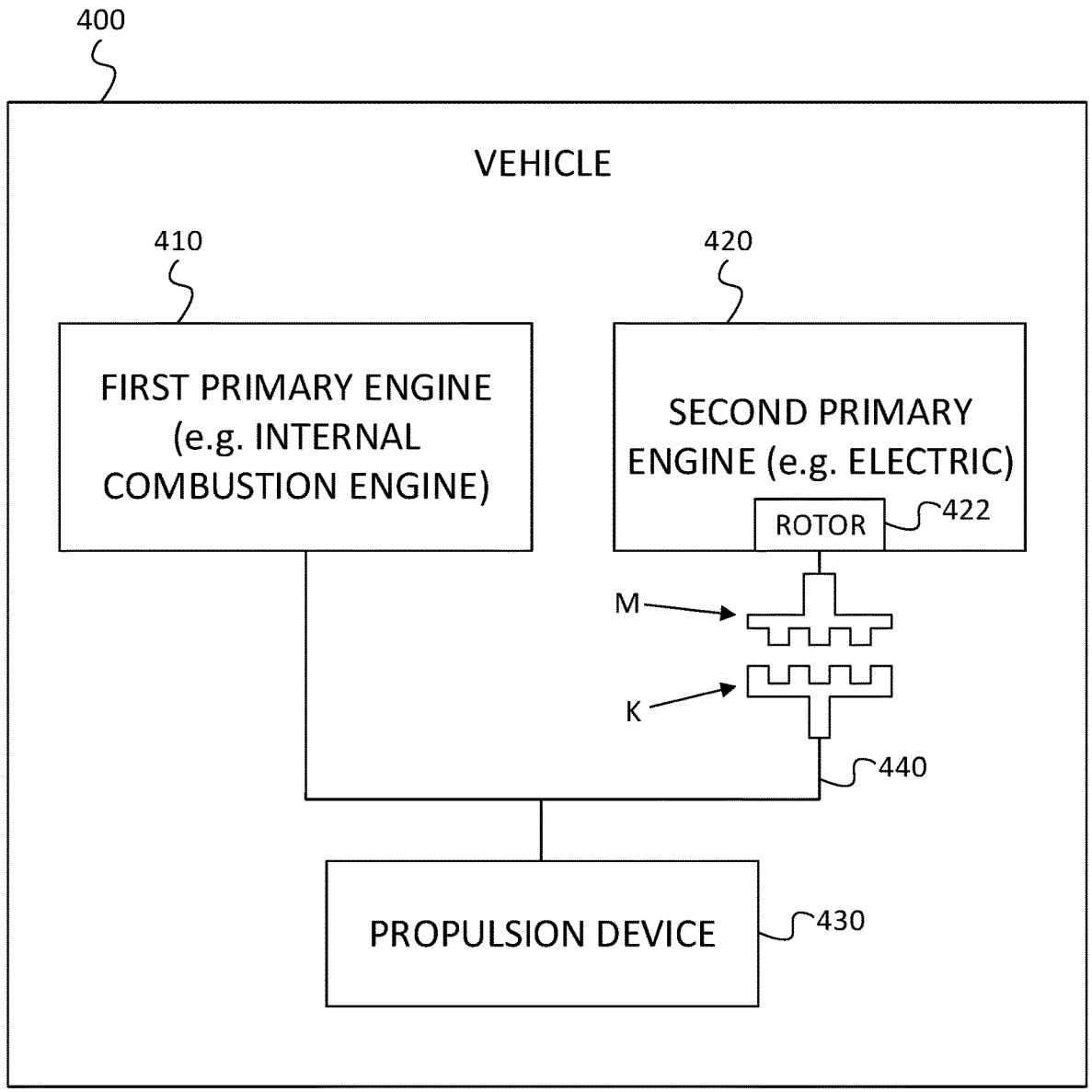
FIG. 4 shows a vehicle including a dog clutch in accordance with the disclosed embodiments.

The crown K is associated with the transmission 440 of the vehicle 400 (see FIG. 4), whereas the sleeve M is associated with a rotor 422 of an electric motor 420 designed to be operatively connected to the transmission 440 of the vehicle 400; if the two gears rotate in the direction indicated by the two arrows Omega_1 and Omega_2, with Omega_1 greater than Omega_2, then side A of the teeth TK1 and TK2 and side MA of the teeth TM1 and TM2 are the pulling or transmission side. Hence, said sides A and MA, after the meshing operation, are the ones that transfer torque from the primary engine 420 to the wheels 430.

According to the invention, at least one pulling side A or MA is tapered towards the vertex VA by means of at least three distinct portions A1, A2, A3 of the pulling side A.

In the example, the pulling side of the tooth A of the crown has this conformation, whereas the teeth MA are "normal", in that they have straight opposite sides, without discontinuity.

In particular, there are at least a first A1, a second A2 and a third portion A3 of the pulling side starting from the base BA of the tooth, wherein the first and the third portion are straight and approximately parallel to a generating line GEN of the crown K (or of the sleeve), so that the tooth is tapered towards a relative vertex VA and the second portion A2 joins the first portion A1 to the third portion A3.

The first portion A1 corresponds to the base of the tooth TK1, TK2.

The surface can be linear, parabolic of hyperbolic.

The top HA of the teeth TK1 is substantially flat and perpendicular to the generating line GEN.

According to FIG. 2, the pitch defined between the two teeth TK1 and TK2 is not constant. In particular, the pitch is equal to S1 in the area of the first portion A1 and equal to S3 in the area of the third portion A3, S3 being greater than S1.

The pitch S1 is selected in such a way that the tolerance T=S1−C is small enough to avoid vibrations when the torque going through the clutch is floating around a zero value.

On the contrary, the pitch S3 can be relatively large, so that the clutch can feature a low actuation force, but the acoustic comfort needs to be taken into account.

According to a proffered clutch implementation method, the crown is associated with a grater inertia, i.e. the inertia of the vehicle, whereas the sleeve is associated with a smaller inertia, i.e. the inertia of an electric motor to be connected to the transmission of the vehicle. By so doing, during the closing procedure, the sleeve rotates at a greater speed than the crown. Furthermore, the sleeve has teeth with straight sides that are parallel to a generating line, whereas the crown is provided with a pulling side configured according to the invention.

Advantageously, the fact that the first portion of the pulling side, i.e. the one closest to the vertex VA of the tooth, is parallel to a directrix line of the gear wheel ensures a neutral behaviour of the clutch when the sleeve meshes with the crown. Neutral means that no axial forces are generated between the two gear wheels.

The second portion of the pulling side develops reaction forces that cause the sleeve to disengage the relative crown. The smaller the axial extension of the second portion is, the greater the reaction forces are. Therefore, the axial extension is correlated to the clutch actuation force.

A line tangent to said second portion forms an angle with a generating line GEN line and this angle alpha must preferably be smaller than 60°. Preferably the angle alpha ranges from 30 to 50°.

According to a preferred implementation of the invention, the dog clutch is implemented to allow an electric motor to be connected to a vehicle transmission.

For example, in US2007267233 the clutch 206 allows the electric motor 56 to be disconnected from the transmission shaft 52. The invention finds advantageous application in the diagram shown in US2007267233, which is referred to herein.

If the crown is associated with the transmission shaft and the sleeve is directly or indirectly connected to the rotor of the electric motor, according to the invention, a synchronization between the crown and the sleeve preferably is carried out, wherein the sleeve rotates at a greater speed than the crown by approximately 15-75 revolutions/minute.

Since the inertia of the electric motor 420 is significantly smaller—even by one or two orders of magnitude—than the one of the vehicle 400 and of the relative possible internal combustion engine 410, connected to the transmission shaft 440 of the vehicle 400, when the actuator is activated to close the clutch, as soon as the sleeve stars meshing with the crown, it is subjected to a sudden slowing down and, therefore, the relative teeth bounce back, thus causing the release sides of the teeth to collide.

This bounce is possible because the pitch S3 is wide enough.

Subsequently, the bouncing oscillations are reduced both due a natural alignment of the rotation speeds and due to the joining portion. A2, which tends to narrow the pitch available for the crests of the teeth of the sleeve.

Since the actuator keeps pushing, the closing of the clutch is completed when the pulling side of the teeth of the sleeve reaches the first portion A1 of the pulling side of the teeth of the crown.

An excessively small speed difference between crown and sleeve does not encourage said bounces, whereas an excessive speed difference between crown and sleeve could lead to a partial closing of the clutch with the teeth working close to the vertices.

Therefore, the synchronization speed should be selected in an appropriate manner, at least one statistical basis.

The invention also applies when the pulling side of the teeth of the sleeve is shaped, instead of the one of the crown or of both of them.

The maximum width of the tooth of the crown in the area of the third portion A3 approximately is 5-20% smaller than the maximum width of the same tooth in the area of the relative first portion A1.

With the indications given herein, a joint was obtained with teeth having a maximum width at the base of 11.5 mm and a maximum width at the vertex of 10.5 mm, with a joining surface inclined at 40° relative to a generating line of the gear wheel.

After numerous tests, we found out that the third portion A3 must have a maximum width that is 5-20% smaller than the maximum width of the first portion A1, so that the insertion of the clutch can take place with a high probability and with a tolerable clearance such as to ensure a good acoustic comfort.

The actuation force, which is necessary to have a probability of success in the closing of the clutch close to 1, was reduced by at least two thirds compared to an identical clutch with crown and sleeve having teeth with straight sides.

With reference to FIG. 2, side B, which is opposite to the pulling side A, is substantially straight and radial, namely approximately parallel to the generating line GEN. The fact of having a straight side opposite to the pulling side ensures that the tooth has the necessary sturdiness, despite being tapered towards the end.

Figure 3:
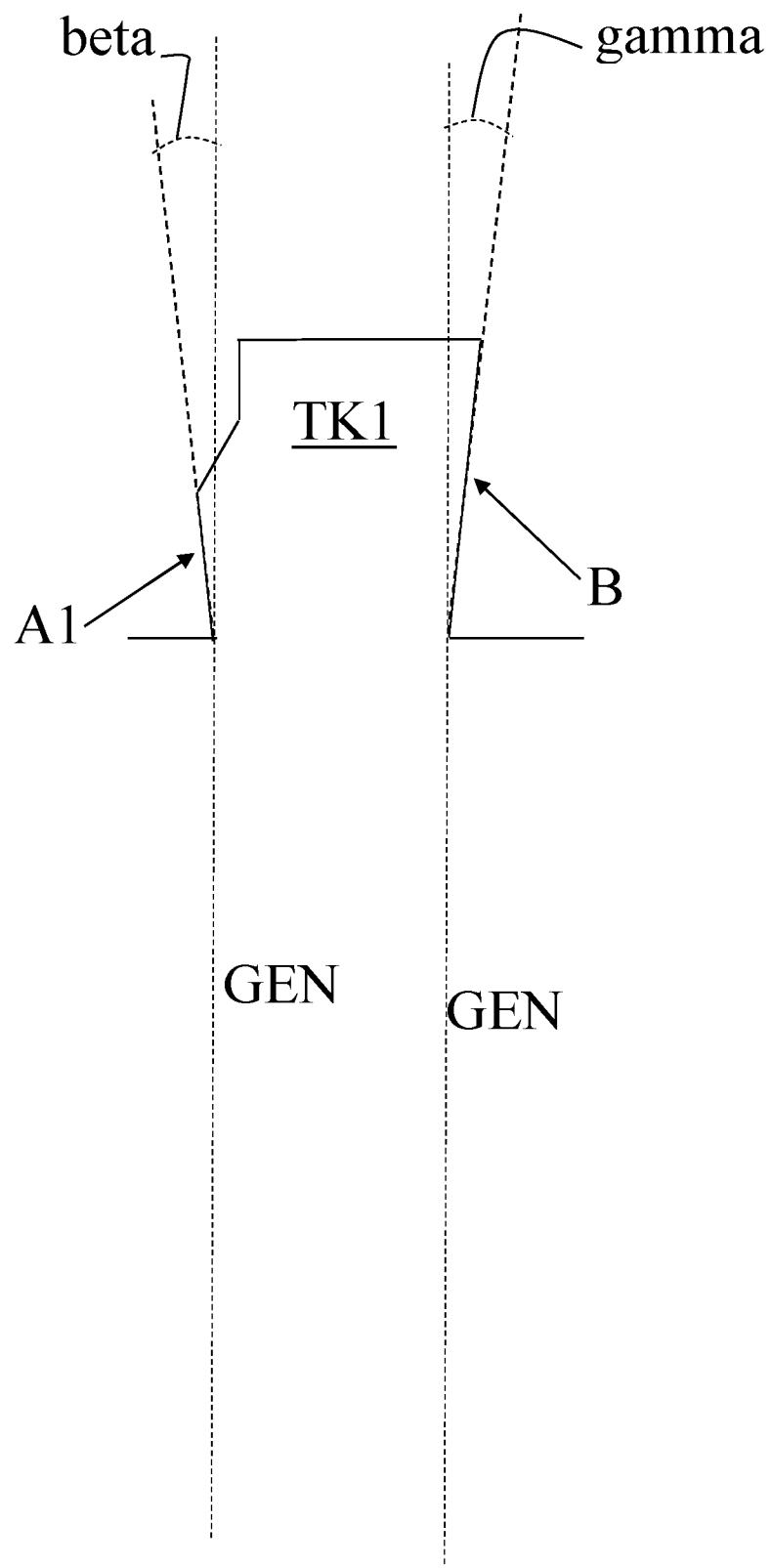
FIG. 3 shows a preferred variant of the dog clutch according to FIG. 2.

With reference to FIG. 3, portion A1 of the transmission side A and side B, which is opposite to the side A, have a diverging development relative to one another.

This divergence is limited. In particular, each one of the angles beta and gamma formed between the generating line GEN and side B or portion A1 approximately is 1°.

The two angles, i.e. beta and gamma, evidently have a contrary sign, since they are opposite.

The teeth TM1, TM2, etc. have straight sides and can also be divergent, as already discussed with reference to the teeth TK1 and TK1. This solution allows the meshing to go on in a natural manner, limiting its actuation force.

The non-limiting example described above can be subjected to variations, without for this reason going beyond the scope of protection of the invention, comprising all equivalent embodiments for a person, skilled in the art.

When reading the description above, a skilled person can carry out the subject-matter of the invention without introducing further manufacturing details. The elements and features contained in the different preferred embodiments, drawings included, can be combined with one another, without for this reason going beyond the scope of protection of this patent application. The information contained in the part concerning the state of art only serves the purpose of better understanding the invention and does not represent a declaration of existence of the items described. Furthermore, if not specifically excluded by the detailed description, the information contained in the part concerning the state of art should be considered as an integral part of the invention.

The invention claimed is:

1. A dog clutch comprising a sleeve (M) and a relative crown (K) each with respective teeth (TM1, TM2, TK1, TK2), the teeth conformed for engaging each one alternatively to the others and wherein, during operation a pulling side (A) for each of said teeth is defined, that identifies a surface through which the torque is transferred, and wherein the pulling side (A) of the teeth of either or both of the crown and the sleeve is conformed so that the relative tooth is tapered from a relative base (BA) towards a relative vertex (VA), wherein said pulling side of said tapered tooth comprises at least three portions (A1, A2, A3) of which a first portion is adjacent to said base (BA) and a third portion is adjacent to said vertex (VA) both following a rectilinear path and substantially parallel to an axis of rotation of said crown or sleeve, and having a second portion (A2) adjoining said first portion with said third portion, wherein a maximum width of said tapered tooth at the third portion (A3) is approximately 5-20% less than the maximum width of the same tapered tooth at the relative first portion (A1).

2. The dog clutch according to claim 1, characterised in that said second portion follows a rectilinear, hyperbolic or parabolic path.

3. The dog clutch according to claim 2, wherein said path is rectilinear and forms an angle (alpha) with said axis of rotation less than 60°.

4. The dog clutch according to claim 3, wherein the angle (alpha) is between 30° and 50°.

5. The dog clutch according to claim 1, wherein a side (B) opposite to said pulling side (A) of said tapered tooth is rectilinear and substantially parallel to said axis of rotation.

6. The dog clutch according to claim 1, wherein a side (B) opposite to said pulling side (A) of said tapered tooth is rectilinear, and wherein said first portion (A1) and said side (B) opposite to said pulling side (A) of said tapered tooth are mutually divergent from said base (BA) towards said vertex (VA).

7. The dog clutch according to claim 6, wherein each one of said side (B) opposite to said pulling side (A) of said tapered tooth and said first portion (A) diverges by an angle, relative to said axis of rotation, of approximately one degree.

8. A vehicle transmission system comprising a first primary engine, a second primary engine, and a transmission designed to transfer the torque from said first and/or second primary engine to a propulsion device, wherein said second primary engine is connected to said transmission through the dog clutch according to claim 1.

9. The vehicle transmission system according to claim 8, wherein the first primary engine is an internal combustion engine and the second primary engine is electric.

10. The transmission system according to claim 8, wherein said sleeve is permanently associated with a rotor of said second primary engine and said crown is permanently associated with said transmission, and wherein an inertia of said second primary engine is less than an inertia of said transmission and wherein said crown comprises said tapered teeth by means of said relative pulling side (A) and wherein the system is configured, during the step of closing the clutch, to bring said sleeve up to a speed greater than the speed of the crown.

11. A terrestrial vehicle comprising the propulsion system according to claim 8, wherein said propulsion device consists in a transmission axle.

12. A naval vehicle comprising the transmission system according to claim 8, wherein said propulsion device consists in a propeller or a waterjet.

\* \* \* \* \*